United States Patent [19]

Watanabe

[11] Patent Number: 5,003,533

[45] Date of Patent: Mar. 26, 1991

[54] NODE PROCESSING SYSTEM

[75] Inventor: Akira Watanabe, Kamakura, Japan

[73] Assignee: Mitsubishi Denki Kabushiki Kaisha, Tokyo, Japan

[21] Appl. No.: 385,241

[22] Filed: Jul. 25, 1989

[30] Foreign Application Priority Data

Jul. 25, 1988 [JP] Japan .................................. 63-185105

[51] Int. Cl.⁵ .................................................. H04J 3/02
[52] U.S. Cl. .................................. 370/85.5; 370/94.10; 370/85.40; 370/85.45; 340/825.05
[58] Field of Search ................... 370/85.5, 94.3, 85.15, 370/16, 89, 94.1, 85.4; 340/825.05

[56] References Cited

U.S. PATENT DOCUMENTS

| | | | |
|---|---|---|---|
| 4,553,234 | 11/1985 | Brandsma et al. | 370/85.15 |
| 4,569,041 | 2/1986 | Takeuchi et al. | 370/85.15 |
| 4,575,846 | 3/1986 | Yokomizo | 370/85.5 |
| 4,587,651 | 5/1986 | Nelson et al. | 370/68 |
| 4,637,013 | 1/1987 | Nakamura | 370/85.4 |
| 4,680,757 | 7/1987 | Murakami et al. | 370/85.4 |
| 4,755,991 | 7/1988 | Goertz | 370/85.15 |
| 4,860,284 | 8/1989 | Brown et al. | 370/85.15 |
| 4,881,074 | 11/1989 | Reichbauer et al. | 370/85.15 |

FOREIGN PATENT DOCUMENTS 0115761 8/1984 European Pat. Off. .
2140180 11/1984 United Kingdom .

Primary Examiner—Douglas W. Olms
Assistant Examiner—Dang Ton
Attorney, Agent, or Firm—Wolf, Greenfield & Sacks

[57] ABSTRACT

In the maintenance of a ring-type local area network, the physical number, physical addresses and connection sequence of nodes in the network can be readily made known without need of any management by system control personnel. To this end, a frame which can be discriminated only by the immediately succeeding station is used, and own addresses are successively set in an information field of the frame to convey the status of physical connection to the succeeding stations.

9 Claims, 3 Drawing Sheets

NODE PROCESSING SYSTEM

BACKGROUND OF THE INVENTION

1. Field of the Invention

This invention relates to a node processing system for a ring-type local area network and, more particularly, to the maintenance of the local area network.

2. Description of the Prior Art

FIG. 3 is a view for explaining the operation of a ring-type local area network adopting a prior art node processing system. In the Figure, designated at TA, TB and TC are data input/output terminals provided in respective stations, A, B and C nodes provided for the respective terminals TA, TB and TC and disposed on a ring channel 1, 10 a token circulated along the ring channel 1 to control the right of transmission of the nodes A to C, and 11 a frame circulated along the channel 1 for transferring data between adjacent ones of terminals TA to TC.

FIG. 4 shows the contents of the token 10 and frame 11. Designated at SD is a starting delimiter indicating the start of the token 10 or frame 11, FC a frame controller for discriminating the token 10 or frame 11, ED an ending delimiter indicating the end of the token 10 or frame 11, DA a destination address, SA a source address, C a control field indicating the distinguishment of information field, I an information field, and CRC an error check code.

A signal on the ring channel 1 is circulated in the direction of arrow in FIG. 3. Unless the token 10 or frame 11 is circulated, an idle pattern without any meaning is circulated. The nodes A to C are assumed to have respective addresses a to c.

Now, the operation will be described. On the ring channel 1 only a single token 10 is present, and it is circulated along the channel 1 at all time. When a node captures the token 10, it can send out the frame 11 to the channel 1. When a node receives a request of transmission from its associated terminal, it produces a format of frame 11 as shown in FIG. 4 and sends out information from the terminal in one field to the ring channel 1. At this time, the address of the node for the destination terminal is provided in the destination address DA, and the address of the source node in the source address SA. Immediately after the frame is sent out, the source node sends out the token 10 to transfer the right of transmission to a different node.

Each node is monitoring the frame on the ring channel 1 at all time, and only when the destination address DA coincides with its own address, it takes in the content of one field and transfer it to the associated terminal. The frame 11 is circulated along the ring channel 1 once and is caused to vanish at the node, from which it is sent out. This can be judged from the coincidence of the source address SA with the own address.

FIGS. 3 and 4 illustrate a case when the frame 11 is transmitted from the node A to the node C. In this case, the destination address DA is c, and the source address SA is a.

For maintaining the ring-type local area network, the number of nodes physically connected to the entire local area network as well as physical addresses and connection sequence of the nodes have to be known. In the prior art node processing system, however, there is no means for simply obtaining the knowledge of the number, physical addresses and connection sequence of nodes. Therefore, it is necessary for the system maintenance personnel to make such management as writing the addresses and connection sequence of nodes on a drawing. This means that the maintenance of a ring-type local area network can not be readily carried out.

SUMMARY OF THE INVENTION

This invention has been intended in order to solve the above problem, and its object is to provide a node processing system, which permits the number, physical addresses and connection sequence of nodes in a ring-type local area network to be readily known, thus permitting ready maintenance of the ring-type local area network.

According to the invention, there is provided a node processing system, in which each node is provided with a function of producing an adjacent station frame capable of being discriminated only by the immediately succeeding station and sending out the adjacent station frame with its own address set in an information field of the adjacent station frame, a function of detecting and receiving an adjacent station frame, producing a different adjacent station frame by additionally setting its own address after the last node address in an information field in the received adjacent station frame and sending out the different adjacent station frame and a function of determining an end of sequence by detecting, when an adjacent station frame is received, the presence of its own address as the first node address in the information field of the received adjacent station frame, these functions permitting the number, physical addresses and connection status of nodes of the entire ring-type local area network to be known from the contents of a received adjacent station frame.

The above and other objects, features and advantages of the invention will become more apparent from the following description taken in conjunction with the accompanying drawings.

DESCRIPTION OF THE PREFERRED EMBODIMENT

Now, an embodiment of the invention will be described with reference to the drawings.

Figure 1:
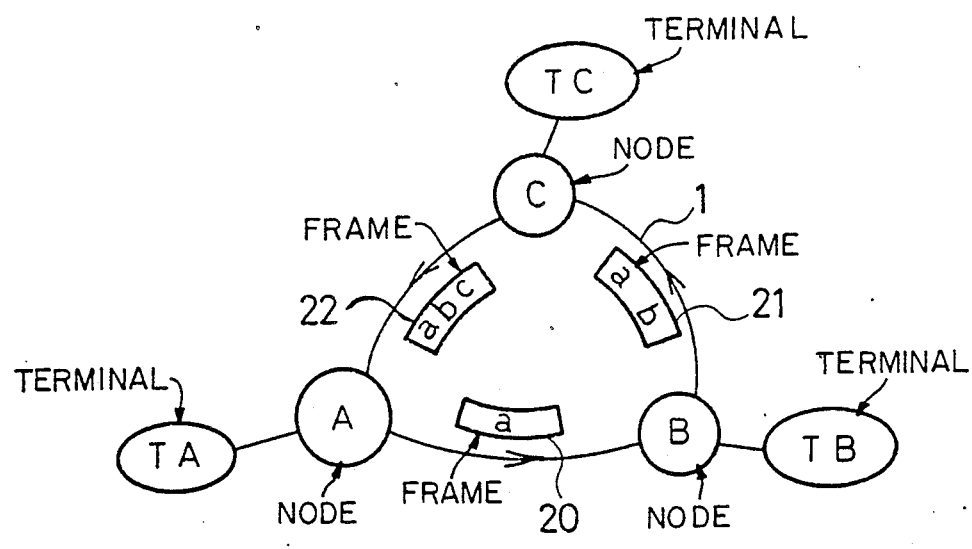
FIG. 1 is a view for explaining an embodiment of the node processing system according to the invention.
Figure 3:
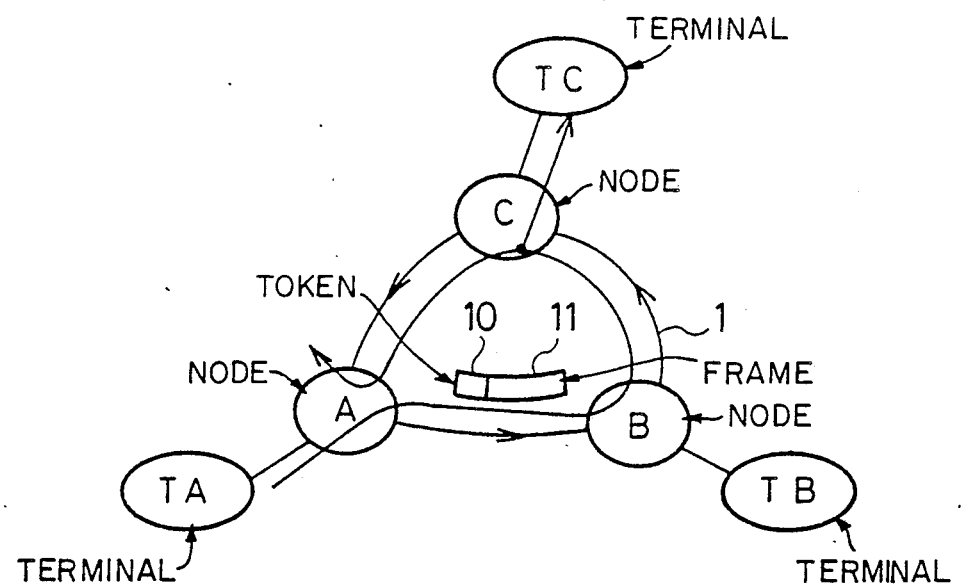
FIG. 3 is a view for explaining a prior art node processing system.

FIG. 1 is a view for explaining the operation of a ringtype local area network adopting an embodiment of the node processing system. In FIG. 1, elements like those shown in FIG. 3 are designated by like reference symbols, and their detailed description is omitted. In FIG. 1, designated at 20 is a frame sent out by the node A, 21 a frame sent out by the node B, 22 a frame sent out by the node C.

Figure 2:
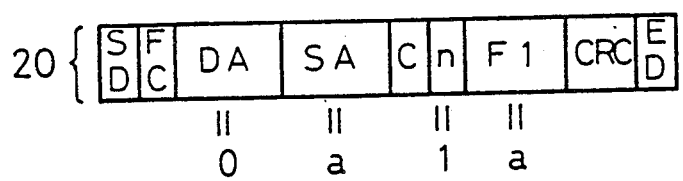
FIG. 2 is a view showing frames for realizing the system.
Figure 2:
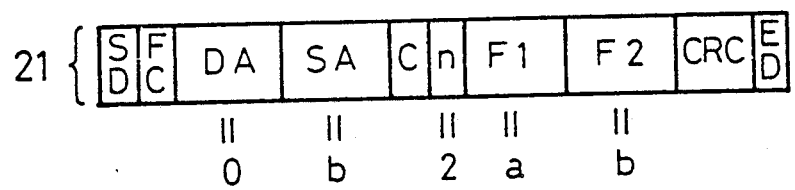
Figure 2:
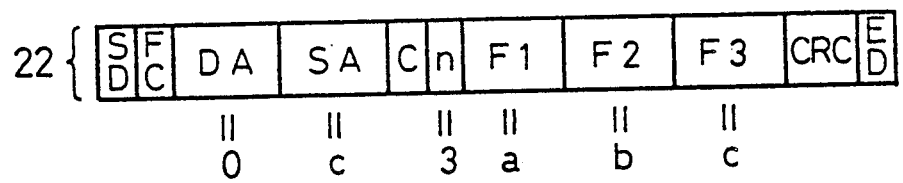
Figure 4:
FIG. 4 is a view showing an ordinarily used frame.
Figure 4:
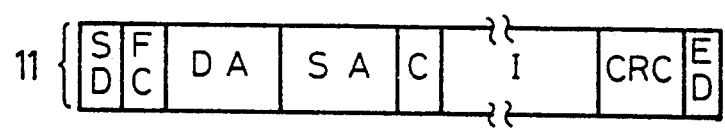

FIG. 2 shows the contents of the frames 20 to 22. In the Figure, elements like those in FIG. 4 are designated by like reference symbols, and their detailed description is omitted. In FIG. 2, designated at F1 is a field added by the node A, F2 a field added by the node B, and F3 a field added by the node C. Designated at n is the number of added fields. The frames 20 to 22 are sent out by the respective nodes A to C for realizing a sequence starting from the node A when the node intends to obtain knowledge of the number, addresses and connection sequence of nodes in the entire network. These frames 20 to 22 are each an adjacent station frame which can be recognized by only the immediately succeeding station. This field can be discriminated with the frame controller field FC, and a node which first detects this frame rewrites the value of the field FC to a different value to realize the adjacent station frame system. The way of realizing the adjacent station frame system is well known in the art, so that it is not described.

Further, the adjacent station frame can be transmitted and erased in the same manner as with the ordinary frame.

The operation will now be described. When the node A intends to obtain knowledge of the number, addresses and connection sequence of nodes in the entire network, it produces and sends out the frame 20. Since this frame 20 is an adjacent station frame, the destination address field DA has no meaning, and "0" is set in it. The source address SA is the address a of the node A. Further, the own address a is set in the field F1 in the information field, and "1" in the field n. The frame 20 is received only by the immediately succeeding node, i.e., the node B in this case. In the above way, the node A produces the adjacent station frame 20, which can be discriminated only by the immediately succeeding station, and sends out this frame with its own address a set in the information field.

The node B, when receiving the frame 20, prepares the frame 21 and sents it out to the ring channel 1. More specifically, when the node B detects the frame 20, it receives this frame. Then, it produces a different adjacent station frame 21 by additionally setting its own address b after the node address a in the information field of the frame 20, and it sends out the frame 21 thus produced. In the frame 21, the destination address DA is again "0", while the source address SA is b. Further, the own node address b is set in field F2 which is added after the field F1, and the number in the field n is changed to "2".

Likewise, the node C, when receiving the frame 21, produces the frame 22 by adding field F3 after the field F2, setting its own address c in the added field and changing the number in the field n to "3", and sends out the frame 22 thus produced.

When the node A receives the frame 22, it determines that one sequence is ended for its own address a is set in the field F1. At this time, the number in the field n in the received frame 22 represents the physical number of nodes in the entire network, and the fields F1 to F3 show the physical addresses and connection sequence of the individual nodes. This means that the node A can obtain these pieces of information.

The above embodiment has concerned with a case where there are three nodes, but the same principles apply to a case where there are four nodes.

Further, while in the above embodiment the number of nodes can be directly made known by the provision of the own address number setting field in the information field and causing each node to change the own address setting field number, it is possible to omit the own address number setting field for the number of nodes can be known by counting the own address setting fields or own addresses.

As has been described in the foregoing, according to the invention use is made of a frame which can be discriminated only by the immediately succeeding station, and the status of physical connection is conveyed to succeeding stations with own addresses successively set in the information field of the frame. Thus, it is possible to let the number, physical addresses and connection sequence of nodes in a ring-type local area network be readily known, thus permitting ready maintenance of the network.

What is claimed is:

1. In a ring-type local area network including a plurality of node stations disposed on a ring channel, a method for determining the configuration of said network comprising the steps of producing in a source node, an adjacent station frame capable of being discriminated only by the immediately succeeding station, sending out said adjacent station frame with the source node address and a node count variable set in an information field of said adjacent station frame, detecting and receiving said adjacent station frame in a destination node, producing a different adjacent station frame by additionally setting the destination node address after the source node address in said information field and by modifying the node count variable in said information field of said received adjacent station frame, sending out said different adjacent station frame, and determining an end of sequence by detecting the presence of the source node address as the first node address in the information field of a received adjacent station frame, said method permitting the number, physical addresses and connection sequence of nodes of the entire ring-type local area network to be known from the contents of a received adjacent station frame.

2. The method according to claim 1, wherein each of said nodes successively adds its own address to the information field of the received adjacent station frame.

3. The method according to claim 2, wherein the step of modifying the node count variable of said information field comprises each immediately succeeding node station incrementing the node count variable in said received adjacent station frame.

4. A method for determining the address and number of nodes in a ring-type local area network having a plurality of station nodes, each node station having an address among which information is transferred, in a transmission direction, by transmission of data packets consisting of a token and a frame, said method comprising the steps of:
   (a) generating, in a node station, a frame recognizable only by an adjacent node station, along said transmission direction, said frame containing a node count field and a node address field;
   (b) modifying said node count field of said frame;
   (c) writing the address of said node station in said node address field;
   (d) transmitting said frame over said ring-type local area network;
   (e) receiving said frame in said second node station; and
   (f) repeating steps (a) through (d) for each node station in said network.

5. The method of claim 4 wherein step (a) further comprises copying the node count field and node address field from a previously received frame.

6. The method of claim 5 wherein step (c) comprises appending the address of said node station after a node address, if any, in said previously received node address field.

7. The method of claim 5 wherein step (b) comprises incrementing the value of the node count field from a previously received frame.

8. The method of claim 5 wherein after each node station has received a frame from an adjacent node station the value of the node count field represents the number of node stations in the ring-type local area network.

9. The method of claim 5 wherein after each node station has received a frame from an adjacent node station the data contained in said node address field represents the node station addresses and sequential order along said transmission direction of all node stations in said network.

* * * * *